MEMBRANE FOR IMAGE CONVERTER AND AMPLIFIER

Original Filed June 9, 1960 4 Sheets-Sheet 1

INVENTOR.
GOTTFRIED R. ROSENDAHL
BY R. P. Campbell
ATTORNEY

MEMBRANE FOR IMAGE CONVERTER AND AMPLIFIER

Original Filed June 9, 1960 4 Sheets-Sheet 2

INVENTOR.
GOTTFRIED R. ROSENDAHL
BY
ATTORNEY

MEMBRANE FOR IMAGE CONVERTER AND AMPLIFIER

Original Filed June 9, 1960 4 Sheets-Sheet 3

INVENTOR.
GOTTFRIED R. ROSENDAHL
BY R. P. Campbell
ATTORNEY

MEMBRANE FOR IMAGE CONVERTER AND AMPLIFIER

Original Filed June 9, 1960 4 Sheets-Sheet 4

INVENTOR.
GOTTFRIED R. ROSENDAHL
BY R. P. Campbell
ATTORNEY 3,284,661
Patented Nov. 8, 1966

3,284,661

MEMBRANE FOR IMAGE CONVERTER AND AMPLIFIER

Gottfried R. Rosendahl, Fort Wayne, Ind., assignor to Ball Brothers Research Corporation, Boulder, Colo., a corporation of Colorado Original application June 9, 1960, Ser. No. 35,079, now Patent No. 3,100,817, dated Aug. 13, 1963. Divided and this application July 1, 1963, Ser. No. 291,826
2 Claims. (Cl. 315—10)

This application is a division of a prior application, Serial No. 35,079, filed June 9, 1960, by Gottfried R. Rosendahl, entitled "Image Converter and Amplifier," said prior application having now matured into U.S. Patent No. 3,100,817.

This invention relates to improvements in an image converter and amplifier and more particularly to a device for displaying, by optical projection, an image which is directly or indirectly produced by electrons, i.e., a device for converting an electron image so as to be suitable for projection by visible light or similar radiation.

The term "directly produced electron image" refers to an electron image which is directly produced on a sensitive surface of the converter. The term "indirectly produced electron image" refers to a uniform charge of electrons on a sensitive surface of the converter which is subsequently or simultaneously influenced by X-ray, ultraviolet, or visible radiation, in such a way that an electron image on the sensitive surface is obtained by re-emission of electrons, with a remaining but reversed intensity distribution of electrons similar to an X-ray, ultraviolet, or visible light image on the sensitive surface.

A prior electron image converter has been used only for the conversion of directly produced electron images, such as produced in a TV picture tube by a scanning beam, into an optical image, which can be projected on a screen by the help of a high power light source. Such a converter utilizes a relief produced on the surface of a special oil by an electronic beam, the oil covering the surface of a spherical mirror in a thin layer. When the oil surface is charged with electrons, forces between the surface charges and probably also between the surface charges and the mirror coating, deform the oil surface so that it then becomes a relief. The relief is used to produce an optical display through a special light system of the "Schlieren" type, which is limited to use with electron images produced by a scanning beam. Such a converter suffers several disadvantages. Thus, its weight, volume, and sensitivity toward heavy vibrations prohibits its use in fast moving vehicles, such as rockets and satellites, and makes its use difficult in air, ground and seagoing vehicles. Another disadvantage of such a converter is the time required for restoration of the original state, i.e., removal of the electron charge and the relief on the oil surface, in order to prepare the surface for a change in the image. This difficulty has been partly overcome by rotating the spherical mirror with the oil, to present a fresh oil surface and thereby gain time in which to restore the used surface to its original state. However, such a solution presents other difficulties, in that the movement of the spherical mirror with the oil must be very precise in order to maintain the optical arrangement. This impairs the possible ruggedness of the equipment and also increases the weight and volume of the device, as well as being quite costly. A further disadvantage of such a converter is the delicacy of the oil surface. The oil surface is directly exposed to the electron beam, which produces chemical changes in the oil which act as impurities to impair proper function, unless they are removed by some special process. Such a special process for removal of such impurities again complicates the instrument and the adverse influence of impurities also hampers field use of the instrument under difficult conditions, as for military purposes. A still further disadvantage is that the electron image and optical image are produced from, or on the same side of, the oil surface. At least one image formation, usually the electron image, then has to be produced by oblique incidence, resulting in at least an undesirable distortion which has to be compensated for by some means. This again increases the complexity of the instrument and increases its weight and bulk. One way of overcoming this disadvantage would be to use a mirror in front of the oil surface with a hole for the electron beam, but this produces the danger of undesired vignetting and unnecessarily lengthens the optical path.

For limited application in the field of telescopy, it is proposed, in Journal of the Optical Society of America, vol. 48, July 1958, page 500, to replace the oil with a thin, uniform, flexible, solid film of low but finite electrical conductivity, having a reflecting coat of aluminum on one side and mosaic of isolated targets on the other side, mounted over a flat ring within a cathode ray tube equipped with a transparent window instead of the usual screen. However, such a device, although providing a system in which electron and optical images are produced from or on opposite sides of the sensitive surface, still leaves room for considerable improvement in sensitivity, in the manner in which the visible light image is produced, in applications other than telescopy, and in numerous other factors.

Among the objects of this invention are to provide an improved device for the display of electron, X-ray, ultraviolet, short wave length, infrared images, or the like, or for the amplification of visible light images; to provide such a device which has in increased sensitivity; to provide such a device which may serve as an amplifier because it acts as a modulator in an optical projection system, thereby providing high power output and requiring a much lower input energy for the modulation; to provide such a device which includes a sensitive membrane which is resistant to shock and does not tend to be warped by excessive heat; to provide such a device which is not restricted to electron images produced by a scanning beam, i.e., those having a grid structure; and to provide such a device which may be utilized with numerous types of electron or image tubes.

Additional objects and the novel features of this invention will become apparent from the description which follows, taken in connection with the accompanying drawings, in which.

Figures 1, 1A:
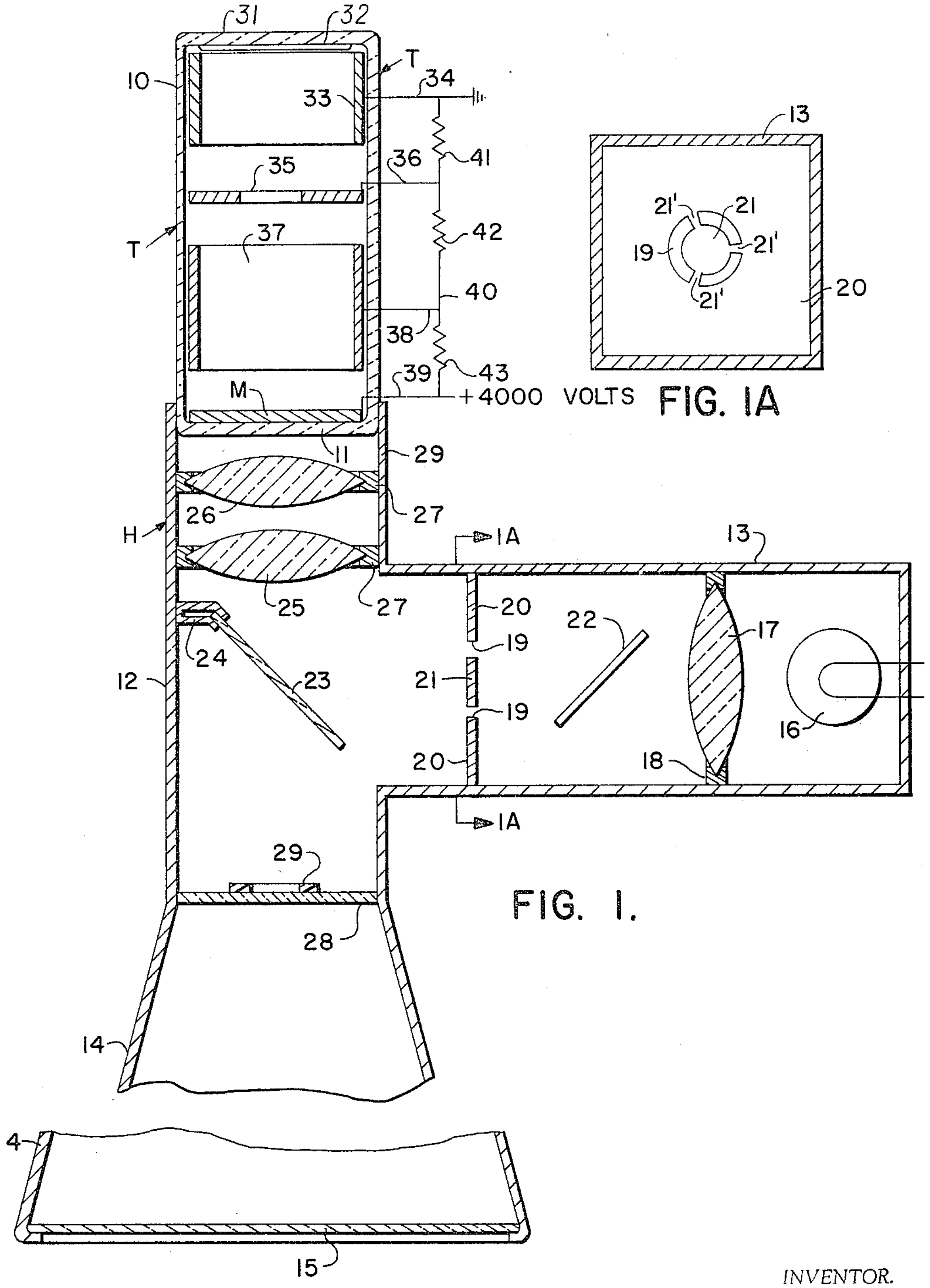
FIGURE 1 is a condensed, longitudinal section of an image converter constructed in accordance with this invention, utilizing a phase contrast principle for illumination and production of the image.
FIGURE 1A is a vertical section along line 1A—1A of FIGURE 1, showing a circular slit arrangement.

In accordance with this invention, an incident light, phase contrast system is utilized with a modified image tube T of FIGURE 1, attached to a housing H in which is installed the parts of the phase contrast image system. The image tube T, having a housing 10, as of glass, has been modified to substitute for the conventional photosensitive screen a clear window 11 and an electroelastic reflective membrane M, whose construction is described later, adjacent or supported by window 11. The housing H, which may be formed of metal, as shown, such as aluminum, may include transverse, intersecting rectangular sections 12 and 13, generally in the form of a T, with one end of section 12 receiving tube T and the opposite end integral with or attached to the smaller end of a diverging section 14, in whose outer end is mounted a translucent screen 15. A light source 16 is mounted adjacent the outer end of housing section 13 and advantageously a suitable condensing lens 17 is mounted in a support 18 attached to the inside of section 13, to image the light source on a circular slit 19 in a plate 20 mounted forwardly of lens 17. Although only one lens 17 has been shown, it will be evident that any number of lenses may be provided to accomplish the desired result. Plate 20 is opaque and thin, while the center circular portion 21 of the plate may be supported by webs 21' which extend from the inner circular portion to the outer portion of the plate, these webs being very thin to prevent interference with the passage of light through the otherwise circular slit 19, or plate 20 may be transparent and the circular slit 19 produced by providing inner and outer opaque areas. Intermediate the lens 17 and the slit 19 is a thin, transparent filter 22, which carries an infrared reflecting layer, such as magnesium fluoride. Since the reflection of such an infrared filter depends on the angle between the reflecting layer and the direction of light, this angle is preferably adjusted so that the heat produced on the face of the electroelastic membrane M by absorption of infrared rays, which reach the membrane from the light source 16, is equal to the heat produced on the opposite side of the membrane by electrons. As described later, an infrared reflective coating is also provided on the face of the membrane M, so that warping of the electroelastic membrane is avoided. Within section 12 of housing H and opposite section 13, a semitransparent mirror 23 is mounted in a bracket 24, and one or more lenses 25 and 26 are supported in aligned relation by mounts 27, between mirror 23 and tube T. Although two lenses 25 and 26 are shown, it will be understood that a single lens or any desired number of lenses may be utilized. At the opposite end of section 12 is a transversely disposed plane glass plate 28, conveniently cemented to the inside of section 12 and on which is centrally mounted a phase ring 29, which is partially transparent and which is conveniently cemented to plate 28, or formed of lacquer. The thickness and refractive index of ring 29 are such that the phase of light passing through the phase ring is changed 180°.

The end 31 of the tube T opposite housing section 12 is conveniently formed of glass, although it may be formed of metal, particularly when an electron image is produced at cathode 32 by radiation entering end 31, which projects electrons through an electron lens system to focus the same on the rear side of membrane M. Cathode 32 preferably comprises a material which will emit a steady, uniform stream of electrons, such as cesium, barium oxide or strontium oxide. The electron lens system comprises a metallic cylinder 33, connected by means of a wire 34 to ground or zero potential, a focusing ring 35, which is at a higher potential than cylinder 33 and is connected to the circuit by means of a wire 36, and a second cylinder 37, at a still higher potential and connected in the circuit by means of a wire 38. The membrane is connected to a high potential, on the order of 4,000 volts, by means of a lead 39, while each of wires 34, 36 and 38 and lead 39 are interconnected by a wire 40, with resistances 41, 42 and 43 of proper amounts to establish the desired potential between the cylinders and the focusing ring. Although the value of 4,000 volts is indicated in FIGURE 1, is will be under stood that this value may be varied, as will be apparent to one skilled in the art.

Figure 2:
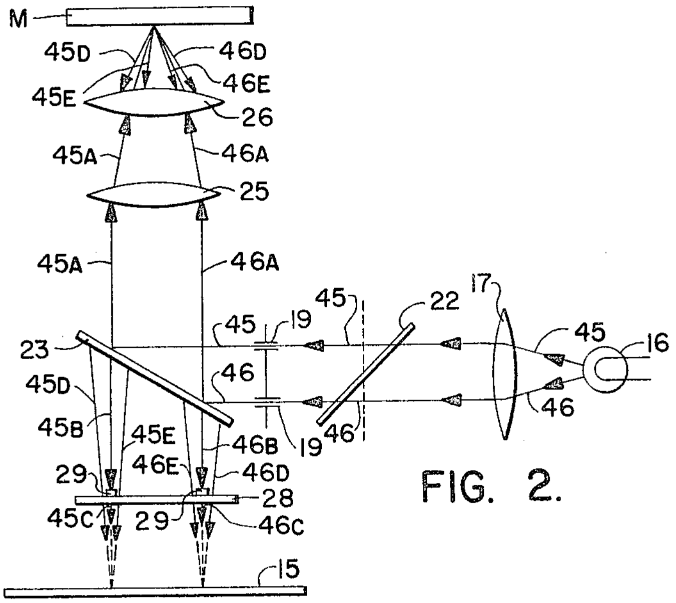
FIGURE 2 is a diagram of the optical system of the image converter of FIGURE 1, showing particularly the paths traveled by light rays.

The path followed by the light rays may best be seen in the diagrammatic illustration of FIGURE 2, in which a pair of light beams 45 and 46 pass through lens 17 and are directed through filter 22 and slit 19, which serves as the entrance pupil for the optical system, represented by lenses 25 and 26, then against semitransparent mirror 23. Mirror 23 reflects part of the light, such as about 50%, so that it passes through the optical system 25–26 and falls on the membrane M, such as represented by rays 45A and 46A. If the membrane does not shown any details or profiles, the light will be reflected by membrane M through the lenses 25 and 26 and semitransparent mirror 23, as indicated by light rays 45B and 46B. It will then pass through the phase ring 29 which is made to coincide with the optical image of slit 19 as produced by lenses 25 and 26 and reflecting membrane M. Because slit 19 was made the entrance pupil, phase ring 29 is the exit pupil of the entire optical system. The phase ring 29 changes the phase of the direct light that strikes it by 180° and also absorbs part of the light. The light rays 45C and 46C which pass through the phase ring, indicated by dotted lines, are projected upon the translucent screen 15, the image produced on the screen being viewed from the opposite side thereof, in the arrangement shown.

The electron image emanates from the cathode 32 to membrane M and as the electrons strike the targets of the membrane, a distortion or profile on the membrane is produced, as will hereinafter appear. This electron image may also be produced by a photo effect, such as X-ray, ultraviolet, visible or near infrared rays. Since the membrane in thin, the distortions or profile will also appear on the opposite side of the membrane, causing any light which strikes its reflective surface to be partially scattered. Thus, when membrane M shows details of a profile, part of the light will be deviated by the profile and by-pass phase ring 29, as indicated by rays 45D, 45E and 46D, 46E. Therefore, their phase and amplitude are not changed by phase ring 29. When the light through the phase ring and that by-passing is united again at the screen 15, it will be influenced by interference to produce darkness or partial darkness on those parts of the screen which correspond to points on the membrane with a profile. The greater the profile, the greater the distortion and hence more light will be deflected past ring 29 to pass through plate 28 and increase the brightness of the image on the screen 15. The relative brightness of the image and background will thus change with the change in profile on the membrane. Without phase ring 29, the image projected upon screen 15 would be phase modulated; however, the human eye can discern only an amplitude modulated image. Therefore, it is necessary to convert the phase modulated image to an amplitude modulated, visible light image. The light need be deflected or scattered through a very small angle to cause a significant change in the brightness and contrast of the image projected upon screen 15. Thus, the relief on the membrane need only have a height of about one-fourth of a wave length to be easily made visible. This is a considerable gain in sensitivity, as compared with the Schlieren system. Although only one slit 19 and one phase ring 29 have been shown, a plurality of concentric phase rings and corresponding slits may be provided, in order to increase the power of illumination.

The converter also acts as an amplifier, since a comparatively small signal is changed into a image of considerable brightness, through use of the high intensity light source 16. In addition, the use of the image converter is not restricted to the line type is image, as produced by an electronic beam scanner, but can easily be combined with the electro-optical image tube T.

Figure 3:
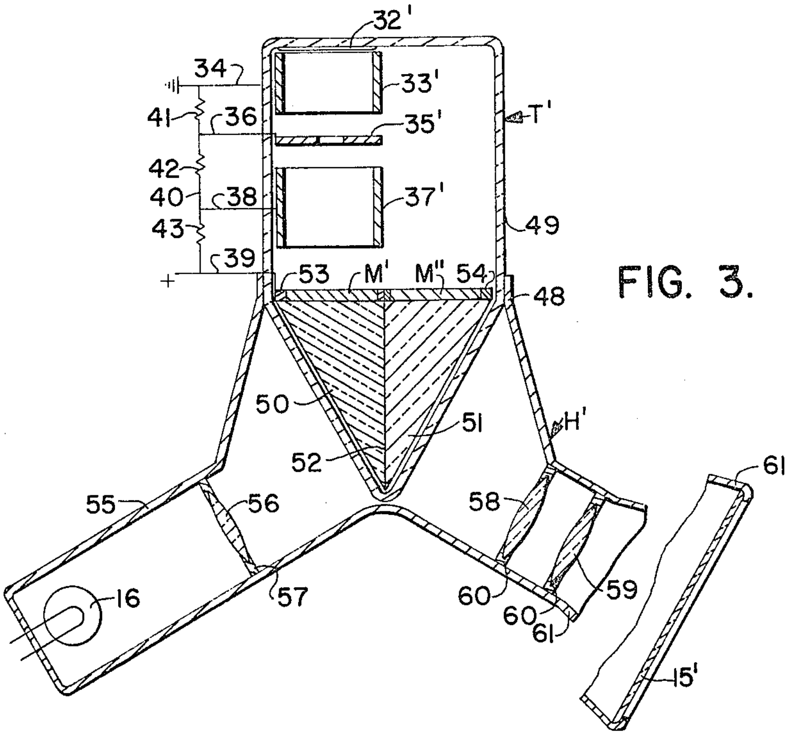
FIGURE 3 is a condensed, longitudinal section of an image converter also constructed in accordance with this invention and utilizing an interference principle for illumination and production of the image.

Another image converter and amplifier constructed in accordance with this invention is the intereferometric or interference type, utilizing a Koester prism, as shown in FIGURE 3, which may be arranged advantageously in a branched housing H′, conveniently formed of aluminum or other suitable material. An image tube T′, received in one end 48 of the housing H′, is provided with a glass envelope 49, in which the Koester prism is conveniently enclosed. The Koester prism actually consists of two prisms 50 and 51, abutting at an interface 52. Each prism is a 60°-30°-90° prism, preferably formed of quartz to prevent distortion of the prisms when heated, while separate membranes M′ and M″ are mounted in rings 53 and 54, attached to the base of the respective prisms 50 and 51, as by cementing. The membrane M′ is activated from a cathode 32′, the electrons emanating from the cathode being focused on the membrane by an electron imaging system comprising cylinders 33′ and 37′ and a focusing ring 35′, with wires 34, 36, 38 and 40, lead 39 and resistances 41, 42 and 43 serving the same purpose previously described. Light may be projected from a light source 16, located in the outer end of an arm 55 of housing H′, through a projection lens 56 securely mounted on a support 57 within arm 55, lens 56 causing the light rays from source 16 to be directed in parallel relation toward and perpendicular to the hypotenuse edge of prism 50. While only one lens has been shown, it will be understood that a plurality of lenses may be provided, if desired. The end of envelope 49 adjacent the Koester prism conforms in shape thereto and light rays emanating from prism 51 will be directed through condensing lenses 58 and 59 held by mounts 60 in the inner end of a diverging arm 61 of housing H′, in the outer end of which is mounted a translucent screen 15′.

Figure 4:
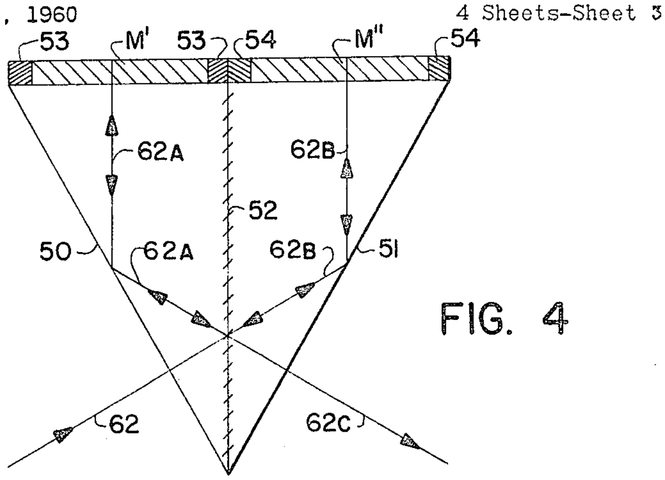
FIGURE 4 is an enlarged section of a prism and associated membranes of the image converter of FIGURE 3, also showing the paths traveled by light rays.

As shown in FIGURE 4, a light ray 62 from source 16 is directed against the hypotenuse of prism 50, passing through the prism until it strikes the beam splitting interface 52, which reflects one-half 62A and the other half 62B passing into prism 51, each being reflected to the hypotenuse surface of the respective prism and refracted onto the reflective surfaces of membranes M′ and M″. Only membrane M′ is affected by the electron image emanating from cathode 32′, while membrane M″ serves to produce interference and thereby provide amplitude modulation to produce a visible image on screen 15′. Thus, the beams 62A and 62B will be reflected back from membranes M′ and M″, as indicated by the double arrows on beams 62A and 62B, and if relief is formed on the membrane M′ by the electron image emanating from cathode 32′, the distance which must be traveled by reflected light beam 62A will be shortened by an amount equal to the height of the profile. Therefore, when the light beams are reflected back from the respective membranes and recombined at the beam splitting interface 52, light beam 62A will be out of phase with light beam 62B, thereby causing a variance in the intensity of the light of the combined light beam 62C, due to the interference between the reflected light beams 62A and 62B. The light beam 62C will be projected through the lens system, including lenses 58 and 59, and the image will be focused upon screen 15′, observed from the exterior. Thus, if a relief has been formed upon membrane M′ by an electron image, within the thickness of one-fourth of a wave length, interference between the two light beams reflected from membranes M′ and M″ will produce the same light intensity variation or contrast as the contrast of the electronic image, after the two light beams are recomposed at the interface 52. The interface 52 is normally provided with a beam splitting layer of platinum, or other suitable material.

A second electron transmitter, affecting membrane M″, can be built into the same tube. The second beam could be used either for superposition of two images, or for correction or adjustment purposes. If, for instance, the first beam plots an image of an oscillographic curve, the second beam can plot a coordinate system. The second beam can also be used for contrast control.

An advantage of the above arrangement, over the phase contrast system is that the former is symmetrical, a factor which helps to eliminate adverse influences. It is also a rigid body, without any additional mechanical adjustment, except the fastening of the two membranes M′ and M″ to the prism.

Figure 5:
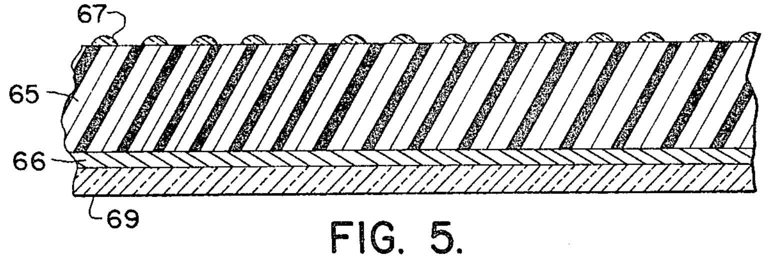
FIGURE 5 is a fragmentary cross section, on an enlarged scale, of an electroelastic membrane which may be used with the image converter of either FIGURE 1 or FIGURE 3.

For the membranes, it is possible to use a comparatively thick membrane, as compared with the membrane proposed for use in the field of telescopy, and a piezo-electric or electro-strictive change in thickness of the membrane under the influence of an electron charge on the sensitive surface of the membrane, with a positive voltage on the opposite, conductive side of the membrane. Such a layer is called here "electroelastic." The electrostrictive or piezo-electric forces will then deform both surfaces equally, so that the opposite surface can be utilized without the necessity of light passing through the membrane. As in FIGURE 5, the membrane may utilize the relief on the back side of a peripherally supported membrane made of electroelastic material 65, which may be a compact layer or powdered ferro-electric material, such as barium titanate, suspended in a plastic or other suitable material. The mixture can be poured into a plane-parallel layer by the help of two optically plane flats or other suitable plane surfaces, such as utilizing the appropriate surface of a prism 50 or 51, and polarized in an electrical field in a known manner. The ferro-electric particles must have a size comparable, or smaller than, an image point of the electronic image to be converted, but large enough to contain several "domains," as known from the theory of ferro-electrics.

The back side of the layer 65 is coated with a highly reflective metal layer 66, to reflect the light from the light source in either the phase contrast or the interferometric systems. A mosaic layer 67 is then deposited on the upper surface of layer 65, for instance, by sputtering or vacuum deposition. The mosaic layer may be any pure metal, but can also be made of a photosensitive material, for the display or magnification of an X-ray, ultraviolet, visible, or short infrared image. Provision should also be made for the indirect electron image to disappear after a reasonable time. This can be done by making the electroelastic layer slightly conductive or placing a semiconductive layer between the photoelastic layer 65 and the mosaic layer 67.

Because it is important that the layer 65 be heated equally on both sides in order to avoid warping, the metal reflective layer 66 on the back side of the membrane is coated with a thin layer of infrared absorbing material 69, such as tinted glass, plastic, or other suitable material. As indicated above, an infrared reflecting layer is provided on filter 22 of FIGURE 1, which is arranged between the light source 16 and the photoelastic layer or membrane M.

Since the reflection of such an infrared filter depends upon the angle between the layer and the direction of the light, the angle is adjusted so that the heat produced on the front side of the electroelastic membrane by absorption of infrared rays is equal to the heat produced on the back side of the membrane by the electrons. In this way, warping of the electroelastic membrane can be avoided.

Figures 6, 8:
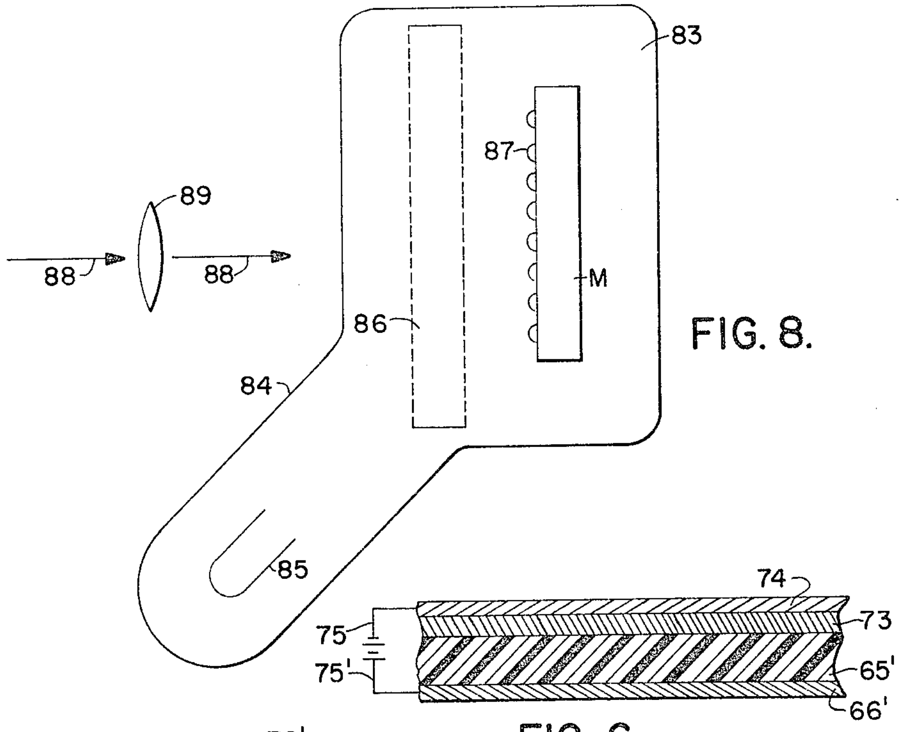
FIGURE 6 is a fragmentary cross section, similar to FIGURE 5, of another form of electroelastic membrane, between two layers of which a direct current is applied.
FIGURE 8 is a diagram of an indirect electron image tube, which may be used in the system of either FIGURE 1 or FIGURE 3.

An alternative membrane utilizing an internal photoelectric effect or photo conductivity may be used, as illustrated in FIGURE 6. This membrane comprises a sandwich consisting of an electroelastic layer 65', covered with a semiconductive layer 73 which changes in conductivity when illuminated by radiation to which it is sensitive, such as properly prepared selenium, cadmium sulfide or other suitable photo-conductive material. The layer 73 is covered by a transparent conductive layer 74, such as a metal layer thin enough to be transparent for the radiation to which the converter is sensitive. The other side of the electroelastic layer 65' is covered with a metal reflecting layer 66' which will carry a profile upon it, along with the electroelastic layer when the latter is subjected to a radiation, and serves to reflect the light from the projection system so that the relief formed by the electroelastic layer will be made visible by either the phase contrast system or interference system. A D.C. voltage is applied between layers 66' and 74, as by leads 75 and 75', so that if the semiconductive layer 73 is illuminated, it becomes conductive to a certain depth and changes the electric field strength through the photoelastic layer 65', which results in a change of thickness of layer 65' and a relief on the surface on which the reflective layer 66' is deposited. The reflective layer 66' then serves to relay the projected light beam from the converter, with the help of the relief formed upon the layer, as explained above. The membrane may be attached to a support by means of the conductive layer 74, provided the support is made from the material which is transparent to the radiation which is to be converted. It can, for instance, be directly attached to the surface of a kinescope, either on the outside whereby the radiation from the phosphor penetrates the glass envelope, or it can be placed inside the picture tube, whereby the phosphor can be directly deposited upon the conductive layer 74. In the latter instance, the projection system acts through the glass envelope in the reflection of the light beam.

Figure 7:
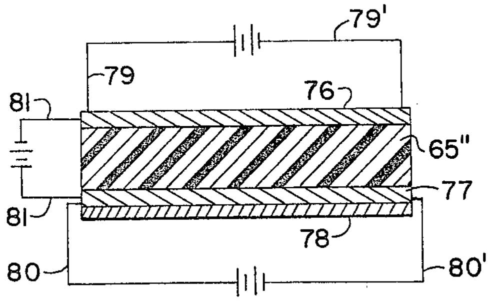
FIGURE 7 is a fragmentary cross section, similar to FIGURE 5, of a further form of electroelastic membrane, across two semi-conducting layers of which two separate but equal D.C. voltages are applied.

A still further embodiment, as in FIGURE 7, of a membrane utilizing a photoconductive layer, includes a photoelastic layer 65'' provided on opposite sides with two semiconductive layers 76 and 77. Semiconductive layer 76 is photoconductive, but while layer 77 need not be photoconductive, it is conveniently made of the same material. The layer 77 is covered with a nonconductive, reflection layer 78, as shown, or may be provided with an insulating layer covered with a metallic reflecting layer. Two equal D.C. voltages are applied across layers 76 and 77, as by leads 79, 79' and 80, 80', respectively. In addition, a D.C. voltage is applied between layers 76 and 77, as by leads 81 and 81', to produce a constant field across the electroelastic membrane 65'' as long as the photoconductive layer 76 is not illuminated. As soon as the photoconductive layer 76 becomes illuminated, however, the resistance of the layer in the illuminated area becomes smaller and thus the voltage drop over that area also becomes smaller. The field between layers 76 and 77 thus changes as a consequence and a relief is formed on the surface or surfaces of the electroelastic membrane 65'', which can be made visible, as explained above, by an optical projection system in which light is reflected from the reflecting layer 78.

The membrane of FIGURE 7 is preferably used with a converter operating on the shadow-graph principle, as described on page 565, Encyclopedia of Physics, vol. XXIV, or on the Francon interference principle, as described in Encyclopedia of Physics, vol. XXIV, page 640, both of which are sensitive to the second derivative of a phase change in the projection image. This is necessary because the change of field between layers 76 and 77 is not a linear or approximately linear function of the intensity distribution in the image formed at the photoconductive layer 76. A projected image, using the shadow-graph or Francon method, would then be obtained in which the boundary line between areas of different contrasts is emphasized, i.e., the outlines of the image objects are clearer. This is not only sufficient for many cases, but would often be an advantage. With such a membrane and projection system, it is of no consequence whether the image objects are lines or points, as in oscillographic displays or star images.

For producing an indirect electron image, a type of tube as shown in FIGURE 8 may be utilized, including an envelope 83 having an arm 84 in which an electron emitting cathode 85 is disposed. Anode 86 is located forwardly of the sensitive converter membrane M and collects electrons re-emitted from the photosensitive mosaic layer 87 of the membrane. The radiation image to be converted to a visible image is directed along a path indicated by arrows 88 and proceed through an image forming system, exemplified by lens 89. The tube of FIGURE 8 may be substituted for the tube T of FIGURE 1 or the tube T' of FIGURE 3.

Figure 9:
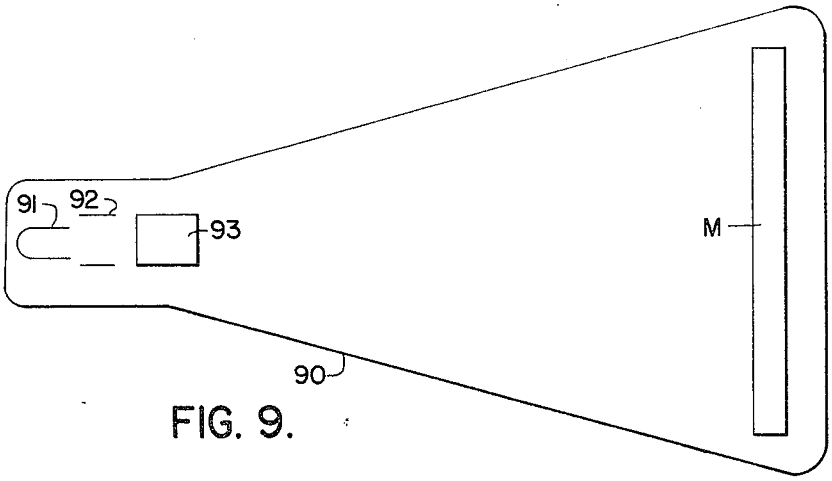
FIGURE 9 is a diagram of a modulated cathode ray tube which may be used with the membrane of either FIGURE 1 or FIGURE 3.

A modulated cathode ray tube, as in FIGURE 9, may also be utilized in lieu of tube T of FIGURE 1 or tube T' of FIGURE 3. The tube of FIGURE 9 includes a flared envelope 90, in the larger end of which is disposed membrane M and in the smaller end of which is disposed a cathode 91, together with vertical deflection plates 92 and horizontal deflection plates 93.

Figure 10:
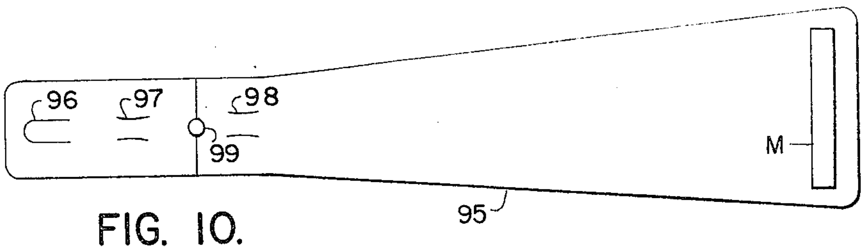
FIGURE 10 is a diagram of an electron microscope which may be used in the systems of either FIGURE 1 or 3.

A membrane M may also be used in the electron microscope tube of FIGURE 10, having an elongated, flared, evacuated envelope 95, with membrane M disposed at the larger end thereof and a cathode 96 disposed in the opposite end, along with an electron optical condenser system 97, and an electron optical objective system 98. The sample to be investigated is placed in a container 99 between the condenser system 97 and objective system 98, through the use of a vacuum lock arrangement. An electron optical projective system may, if desired, be interposed between the objective system 97 and the membrane M. The tube of FIGURE 10 may also be substituted for tube T of FIGURE 1 or tube T' of FIGURE 3.

From the foregoing, it will be evident that an image converter and amplifier constructed in accordance with this invention fulfills to a marked degree the requirements and objects hereinbefore set forth. Through the image converters and amplifiers of this invention, electron, X-ray, ultraviolet, infrared images, or the like, may be converted to a readily visible light image. This is accomplished by means of an electroelastic membrane provided in an optical system, wherein an excitation image is directed against one side of the electroelastic membrane, causing a distortion thereof so that visible light reflected from the opposite side of the membrane may be projected against a viewing screen. In the embodiment of FIGURES 1 and 2, this is accomplished by using an optical system wherein light is projected through a slit and focused by means of a lens system on the membrane. If the membrane has been distorted so as to have a profile, some of the reflected light will be scattered, the unscattered light passing through a phase ring, causing the phase of that light to be changed by 180°, while the deflected or scattered light bypasses the phase ring and combines with the unscattered light on the screen. This arrangement causes a phase modulated image, which would otherwise be produced, to be converted to a visible, amplitude modulated image on the screen. Thus, it can be seen that a change in the profile on the membrane causes an increase or decrease in the amount of scattered light, resulting in a change in the brightness of the image and background projected on the screen. This is a considerable gain in sensitivity, as compared with the Schlieren system. Also, in this embodiment a thin, transparent filter placed between the light source and membrane and carrying an infrared reflecting layer, may be angularly adjusted with respect to the direction of the light, so that the heat produced on the face of the electroelastic membrane, by absorption of infrared rays, may be made equal to the heat produced on the opposite side of the membrane by the excitation beam, so that both sides of the membrane will be heated equally to avoid warping.

Equally desirable results may be obtained by the use of an interferometric or interference type system, utilizing a Koester prism, as in the embodiments of FIGURES 3 and 4. This system has an advantage over the phase contrast system in that it is symmetrical, helping to eliminate adverse influences. Also, the membrane is a rigid body, without any additional mechanical adjustment, except the fastening of the two membranes to the prisms. In this embodiment, the light is split at the interface of the prisms and reflected onto the membranes, then redirected back to the interface where it is recombined and projected onto the viewing screen. A profile may be formed on one membrane, as by an electron image directed against the rear side thereof, to reflect the visible light rays, and cause a slight difference in the length of travel of the portion of the light beam directed against this membrane. Thus, the light beams will be out of phase when they recombine at the interface of the prisms, causing an amplitude modulation of the light which is projected against the screen. Thus, it can be seen that this optical system also converts an excitation image to a visible, amplitude modulated image through interference of the reflected light beams. Furthermore, in this embodiment, a second beam may be projected against membrane M″ for contrast, control or other purposes.

It will further be apparent that the image converter and amplifier of both embodiments is not restricted to electron images produced by a scanning beam having a grid structure, but may be used with numerous types of electrons or image tubes. Also, the membrane used therewith is of relatively rugged construction which is resistant to shock, so that the device may be used under the most adverse conditions, such as for military purposes.

Although preferred embodiments of this invention have been illustrated and described, it will be understood that other embodiments may exist and various changes and variations made, without departing from the spirit and scope of this invention.

What is claimed is:

1. A membrane for an image converter and amplifier, comprising: a layer including particles of electroelastic material; a thin layer of light reflecting metal on one side thereof; a mosaic layer on the opposite side thereof of material sensitive to an image producing beam; and a layer of infrared absorbing material on said light reflecting layer.

2. A membrane for an image converter and amplifier, comprising: a layer including particles of electroelastic material; a semiconductive layer on each opposite side thereof with at least one of said semiconductive layers being a photoconductive layer; a thin layer of light reflecting metal on the other of said semiconductive layers; means for producing a direct current voltage difference between said semiconductive layers; and means for producing a direct current voltage difference across each of said semiconductive layers.

References Cited by the Examiner

UNITED STATES PATENTS

| | | | |
|---|---|---|---|
| 2,896,507 | 7/1959 | Mast et al. | 88—61 |
| 3,123,737 | 3/1964 | Schneeberger | 315—10 |

DAVID G. REDINBAUGH, *Primary Examiner.*

J. E. BECK, T. A. GALLAGHER, *Assistant Examiners.*